S. C. SALISBURY.
Blast Furnace.
No. 54,215.
Patented April 24, 1866.
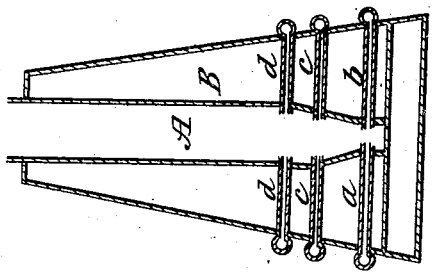
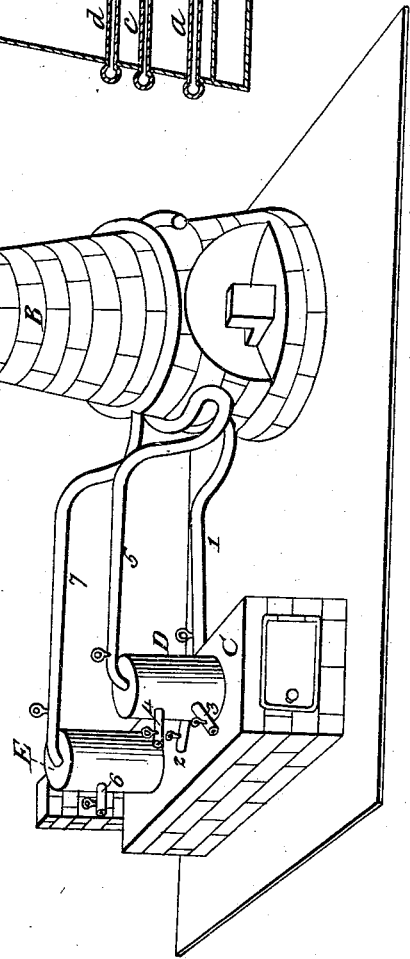

UNITED STATES PATENT OFFICE.

SILAS C. SALISBURY, OF NEW YORK, N. Y.

IMPROVEMENT IN BLAST-FURNACES.

Specification forming part of Letters Patent No. 54,215, dated April 24, 1866; antedated April 19, 1866.

*To all whom it may concern:*

Be it known that I, SILAS C. SALISBURY, of the city of New York, in the county of New York and State of New York, have invented certain new and useful Improvements in Blast-Furnaces; and I do hereby declare that the following is a full, clear, and exact description thereof and of their mode or manner of operation, reference being had to the accompanying drawings, and to the letters of reference marked thereon, making a part of this specification.

The nature or character of my invention or improvement consists in introducing into the furnace, in addition to the ordinary hot-air blast, a current or blast of the combined gases derived from petroleum or similar oil, water, and air, and with such proportions of carbon, hydrogen, and oxygen that these gases, when united or combined with the gases generated in the furnace, will produce a much more intense heat than can be obtained by any of the ordinary methods or processes of combustion, and also in introducing into such a furnace, in the place of the limestone ordinarily mixed with the ore, a current or blast of vaporized concentrated lime-water, thereby securing a more complete and perfect action of the lime for fluxing and preventing accumulation of slag.

Figure 1 is a general view of a blast-furnace, showing its connection with the ordinary hot-air blast, and also with my improvement of gas and lime-vapor blasts. Fig. 2 is a vertical sectional view of such furnace, showing the application of the several blasts to it.

The blast-furnace is constructed in the usual manner, and the hot-air blast is applied as in ordinary cases.

A represents the furnace proper, with its surrounding masonry B; and C, a furnace for supplying a hot-air blast, which is conveyed through a pipe, 1, and forced into the furnace through tuyeres *a b*, located as found most desirable and efficacious.

In connection with such furnace C are two retorts or reservoirs, D and E, in one of which, D, is generated or heated the gas derived from the oil, water, and air, and in the other of which, E, is vaporized the highly-concentrated lime-water.

To the retort D oil and water are supplied, through the pipes 2 and 3, into vaporizing-pans or perforated tubes, by which they are converted into gases, which are mixed with the gases of the air admitted through the pipe 4. The quantity of oil, water, and air supplied to the retort is regulated by means of the gage-cocks in such pipes. The proportionate quantities of the oil, water, and air supplied to such retort should be such as to insure a combination of the gases produced from those different substances, such as shall not be explosive as it comes in contact with the gases generated from the fuel and heated air of the furnace.

A cubic inch of petroleum to two and a half cubic feet of water and five cubic feet of air has been found a satisfactory proportion, though such relative quantities may be considerably varied.

The gas from the retort D is conveyed through a pipe, 5, which encircles the furnace, and from which branch pipes *c c* extend into the furnace A to supply such gas-blast to the interior and in direct contact with the ore. These pipes *c c* open into the furnace proper at or near the melting-point.

The combined gases produced in or supplied from the retort D, as they enter the furnace A, combine or unite with the gases there generated in a greatly-increased volume, and such combination produces a flame or heat much more intense than can be produced from any ordinary combustion, and by causing such gases to enter the furnace at or about the point or place where the ore melts such intense heat is applied where it will be most effectual, and as a result much larger quantities of the ore will be melted, and the furnace can be drawn much oftener.

The retort or vessel E is supplied, by means of the pipe 6, with highly-concentrated lime-water, which is vaporized and highly heated. Such lime-vapor blast is transmitted, through the pipe 7, which also encircles the furnace, and its branch pipes *d d*, which enter the furnace A, directly into the interior of the furnace, and is forced in immediate contact with the ore therein. Such lime-vapor blast takes the place of the limestone put into the furnace along with the ore, and by being brought in contact, in the form of a highly-heated vapor, with the melting or heated ore its effect is greatly increased as a flux and in preventing the accumulation of slag, and such vapor can be applied at any part or parts of the furnace found most desirable.

Another great advantage derived from this process, or by the use of such gas and lime-vapor blasts, is that the sulphurous parts of the ore and coal, having a great affinity for hydrogen, are taken up by the hydrogen of such blasts, and the carbon passes to the iron, thus making it of a superior quality.

The drawings show the gas and lime-vapor blasts as admitted to the furnace A in but three places; but in practical operation the number of pipes supplying such blasts to such furnace may be increased as found desirable.

The manner of generating such combined gases and vaporizing the lime-water and supplying them to the blast-furnace may be varied according to localities or convenience, the particular methods of effecting such operations being immaterial.

What I claim as my invention, and desire to secure by Letters Patent, is—

1. The application and use in blast-furnaces of a blast or current of the combined gases of oil, water, and air, combined substantially as described, applied and used substantially as and for the purposes set forth.

2. The application and use in such furnaces of a blast or current of highly-heated lime-water vapor, substantially as and for the purposes set forth.

SILAS C. SALISBURY.

Witnesses:
S. D. LAW,
W. R. RONOLDS.